United States Patent [19]
Stoner

[11] Patent Number: 5,316,261
[45] Date of Patent: May 31, 1994

[54] FLUID CONDUIT HAVING A VARIABLE INNER DIAMETER

[75] Inventor: George S. Stoner, Woburn, Mass.

[73] Assignee: Northern Research & Engineering Corp., Woburn, Mass.

[21] Appl. No.: 966,476

[22] Filed: Oct. 26, 1992

[51] Int. Cl.⁵ .................. F16K 7/07; F16K 31/02; G01F 1/42
[52] U.S. Cl. .................. 251/5; 73/708; 73/861.63; 138/45; 251/61.1; 251/129.04; 251/129.08; 251/205
[58] Field of Search .................. 60/527, 528; 251/4, 251/5, 11, 61.1, 129.04, 129.08, 205; 73/708, 861.53, 861.63; 138/45, 46

[56] References Cited

U.S. PATENT DOCUMENTS

| | | | |
|---|---|---|---|
| 2,241,086 | 5/1941 | Gould | 251/5 |
| 2,402,585 | 6/1946 | Allison | 73/861.53 |
| 2,662,550 | 12/1953 | Meyer | 251/4 |
| 2,898,088 | 8/1959 | Alder | 251/5 |
| 2,925,251 | 2/1960 | Arps | 251/5 |
| 2,989,281 | 6/1961 | Fritts | 251/11 |
| 3,168,805 | 2/1965 | Fleury | 251/11 |
| 4,006,634 | 2/1977 | Billette | 73/861.53 |
| 4,013,557 | 3/1977 | Snodgrass et al. | 251/5 |
| 4,083,245 | 4/1978 | Osborn | 73/861.53 |
| 4,108,418 | 8/1978 | Ensign et al. | 137/375 |
| 4,135,550 | 1/1979 | Andersson | 251/5 |
| 4,375,169 | 3/1983 | Torresin | 73/861.53 |
| 4,790,194 | 12/1988 | Bellows | 73/861.53 |
| 4,918,994 | 4/1990 | Kramer | 73/861.53 |
| 5,118,071 | 6/1992 | Auelle | 251/5 |
| 5,131,423 | 7/1992 | Shaw | 251/5 |

OTHER PUBLICATIONS

American Cyanimid Company brochure, Oct. 1986.
"Putting ER Fluids to Work, Machine Design", May 9, 1991, pp. 52–60.
"Electrorheological Fluids and Devices", Automotive Engineering Dec. 1988, pp. 45–48.

*Primary Examiner*—George L. Walton
*Attorney, Agent, or Firm*—Michael H. Minns

[57] ABSTRACT

A flow measuring or flow metering device having a dynamically variable inner diameter. The flow device uses electrorheological fluid to support an inner flexible membrane. The quantity of electrorheological fluid is varied to change the inner diameter of the flexible membrane.

6 Claims, 1 Drawing Sheet

FLUID CONDUIT HAVING A VARIABLE INNER DIAMETER

BACKGROUND OF THE INVENTION

This invention relates generally to fluid conduits, flow metering devices and flow measuring devices and more particularly to fluid conduits having variable flow restrictors.

Typically, butterfly type throttle devices are used to control fuel and air flow to an engine or turbine combustor. The butterfly throttle can cause vortices in the fuel/air mixture and can impose a directional flow. These non-uniformities in the flow can cause uneven or inefficient combustion.

The foregoing illustrates limitations known to exist in present flow metering devices. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a fluid conveying device comprising a fluid conduit having a dynamically variable inner diameter and a means for varying the inner diameter of the fluid conduit.

The foregoing and other aspects will become apparent from the following detailed description of the invention when considered in conjunction with the accompanying drawing figures.

BRIEF DESCRIPTION OF THE DRAWING FIGURES

FIG. 1 is a schematic representation of a variable diameter fluid device of the present invention; and FIG. 2 is a cross-sectional view of the fluid conduit portion of the variable diameter fluid device shown in FIG. 1.

DETAILED DESCRIPTION

Figure 2:
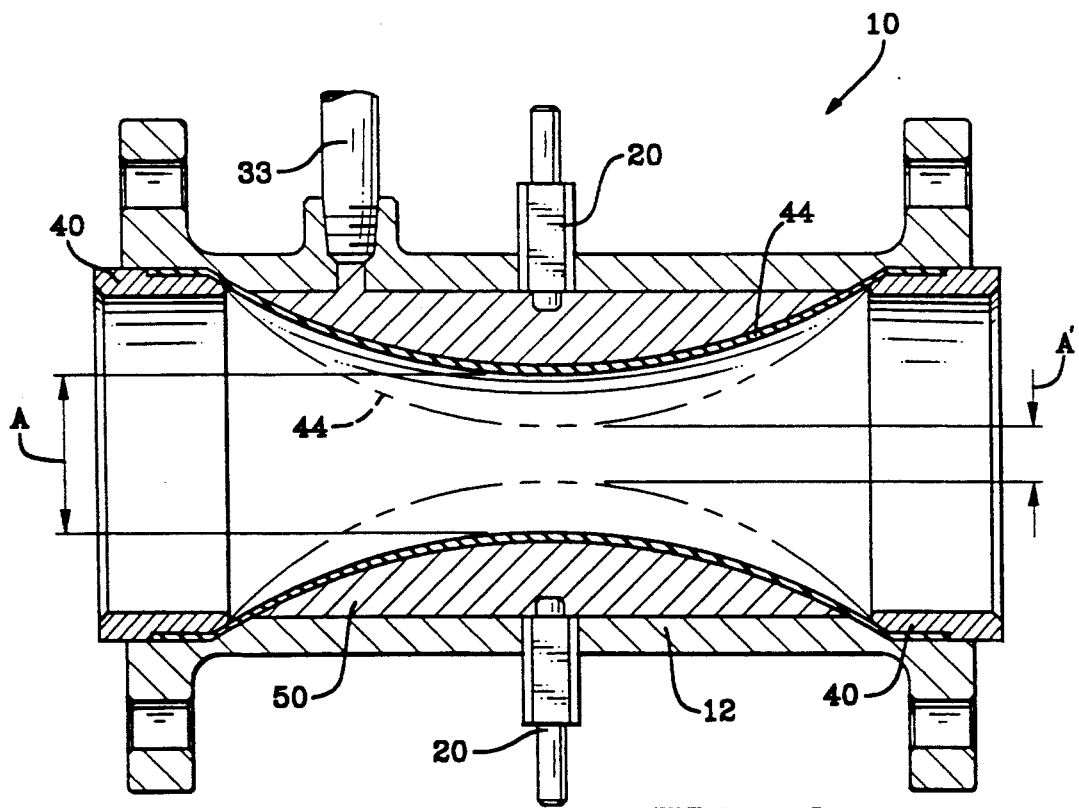

FIG. 2 is a cross-section of a variable diameter fluid device 10 having a variable inner diameter A. The device 10 is comprised of a fixed diameter fluid conduit 12 with a flexible membrane 44 fixed by end rings 40 to the inside of the fluid conduit 12. A quantity of electrorheological fluid 50 is interposed between the flexible diaphragm 44 and the fluid conduit 12.

Electrorheological fluids comprise slurries of finely divided hydrophilic solids in hydrophobic liquids. In the absence of an electric field these fluids behave in a Newtonian fashion. But, when an electric field is applied, the fluid becomes more viscous as the electric field is increased. The viscosity change continues until the fluid becomes substantially a solid upon application of a sufficient potential. The viscosity transformation of this fluid occurs in a very short period of time.

Typical electrorheological fluids have a yield stress of 2 kPa, and a viscosity of 100 Mpa·s with an applied electric field of 4 kV/mm and a current density of 0.1 $\mu A/cm^2$. Electrorheological fluids change from liquid to solid in approximately 0.001 seconds.

Electrorheological fluid 50 is added to or removed from the region between the fluid conduit 12 and the flexible membrane 44 to obtain the desired inner diameter A. At least two electrodes 20 are attached to fluid conduit 12. These electrodes 20 extend through the wall of the fluid conduit 12 and are in electrical contact with the electrorheological fluid 50. In order to apply an electric field to the electrorheological fluid 50, the electrodes 20 should be electrically isolated from the fluid conduit 12. The preferred method of electrical isolation is a fluid conduit 12 formed of non-conductive material. Other methods include insulating material between the electrodes 20 and the fluid conduit 12 and a non-conductive surface on the inside of the fluid conduit 12.

Once the desired inner diameter A is obtained, an electric field (or voltage) is applied to the electrodes 20, thereby causing the electrorheological fluid 50 to solidify. The electrorheological fluid 50 is solidified in order to rigidly support the flexible membrane 44 so that the flexible membrane 44 will not be displaced radially or axially by the pressure of the fluid flowing through the device 10. If a gaseous or non-solidifying fluid were used to support the flexible membrane 44, the membrane would most likely be displaced by the pressure of the fluid.

Figure 1:
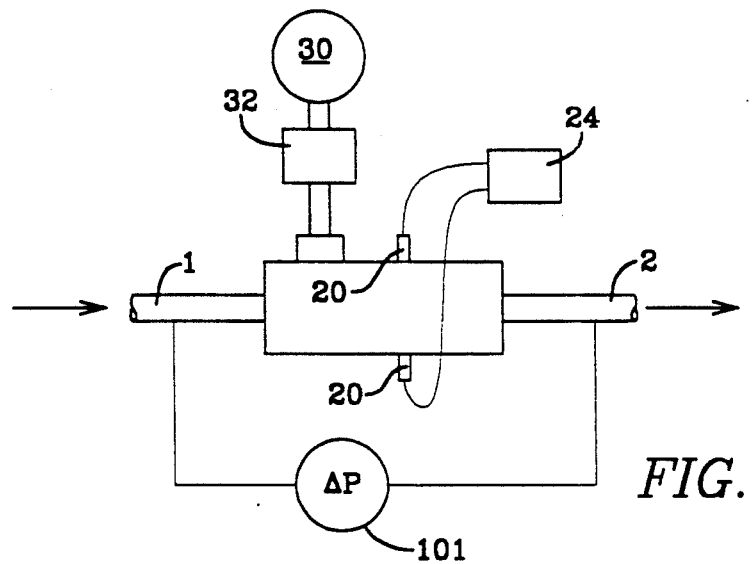

FIG. 1 shows the variable diameter fluid device 10 in a fluid system along with an electrorheological fluid reservoir 30 and transfer apparatus 32 and an electric field controller 24. The transfer apparatus 32 is connected to the fluid conduit 12 by port 33. Fluid flows into the device 10 through an inlet 1 and exits through an outlet 2. One use of this device is to meter fuel into a combustion chamber of a turbine combustor. The parameter which is to be controlled, speed, power, etc. is measured and a control signal is generated to adjust the fuel flow to the required flow. The measurement and control devices are known in the art and are not shown in FIG. 1.

The control signal is used to vary the quantity of electrorheological fluid 50 within the chamber formed by the flexible membrane 44 and the fluid conduit 12. First, the electric field is turned off, allowing the electrorheological fluid 50 to liquify. Electrorheological fluid 50 is transferred between reservoir 30 and the chamber by a transfer apparatus 32. After the quantity of electrorheological fluid 50 in the chamber has been adjusted to achieve the new required inner diameter A', the electric field controller 24 applies an electric field to the electrodes 20 thereby causing the electrorheological fluid 50 to solidify.

Another use of the variable diameter fluid device 10 is to measure flow through a pipe. A common method for measuring flow is to measure the pressure drop across an orifice in the pipe. The flow is proportional to the pressure drop and the size of the orifice. The size of the orifice determines the flow range over which the flow measurement is accurate. An orifice which is accurate at normal operating flows may be very inaccurate at low startup flows. If the variable diameter fluid device 10 is used to measure flow, the inner diameter A of the device 10 can be varied to provide accurate flow measurement for a wide variety of flows. FIG. 1 shows a pressure differential or pressure drop measuring device 101 for measuring the pressure drop across the variable diameter fluid device 10.

Another use of this device is to turn flow on and off. In this application, the quantity of electrorheological fluid 50 in the chamber is increased until the inner diameter A is zero, thereby shutting off flow.

Fluids other than electrorheological fluids may be used. The fluid characteristics should include rapid phase change from liquid to solid and solid to liquid and there should be little or no volume change as the fluid phase changes. This could include fluids which undergo phase change in response to magnetic fields or temperature.

Having described the invention, what is claimed is:

1. A fluid metrological device comprising:
   a conduit having a dynamically variable inner diameter;
   a means for varying the inner diameter of the conduit, the means including a varying quantity of electrorheological fluid;
   a means for varying the shear stress of the electrorheological fluid and causing the electrorheological fluid to become substantially solidified thereby fixing the inner diameter of the conduit; and
   a means for measuring flow through the conduit, wherein the means for measuring flow comprises a means for measuring the flow induced pressure drop across the conduit, the flow induced pressure drop being proportional to the inner diameter of the conduit.

2. The fluid metrological device according to claim 1, wherein the means for varying the inner diameter of the conduit includes:
   a reservoir of electrorheological fluid; and
   a means for transferring electrorheological fluid between the reservoir and the conduit.

3. The fluid metrological device according to claim 2, wherein the conduit is formed of electrically non-conductive material.

4. The fluid metrological device according the claim 1, wherein the means for varying the shear stress of the electrorheological fluid includes at least two electrodes in contact with the electrorheological fluid; and
   a means for controlling the application of voltage to the electrorheological fluid, the application of voltage causing the substantial solidification of the electrorheological fluid.

5. A flow measuring device comprising:
   a conduit;
   a flow orifice within the conduit, the flow orifice having a dynamically variable inner diameter whereby the operating range of the flow measuring device is changeable;
   a means for varying the inner diameter of the flow orifice, the means for varying the inner diameter of the flow orifice including a quantity of electrorheological fluid;
   a means for controlling the application of voltage to the electrorheological fluid, the application of voltage causing the substantial solidification of the electrorheological fluid, thereby fixing the inner diameter of the flow orifice; and
   a means for measuring the flow induced pressure drop across the flow orifice, the flow induced pressure drop being proportional to the inner diameter of the orifice.

6. A flow measuring device comprising:
   a flow orifice, the flow orifice being comprised of a fluid conduit having an inner surface; a tubular flexible membrane having a variable inner diameter, each end of the tubular flexible membrane being secured to the inner surface of the pipe; and a quantity of electrorheological fluid between the flexible membrane and the fluid conduit;
   a means for varying the quantity of electrorheological, thereby changing the inner diameter of the tubular flexible membrane;
   at least two electrodes in contact with the electrorheological fluid;
   a reservoir of electrorheological fluid;
   a means for transferring electrorheological fluid between the reservoir and the region between the flexible membrane and the fluid conduit;
   a means for controlling the application of voltage to the electrodes, the application of voltage to the electrodes causing substantial solidification of the electrorheological fluid whereby the flexible membrane assumes a fixed shape and resists pressure induced shape changes caused by variations in flow in the fluid conduit; and
   a means for measuring the flow induced pressure drop across the flow orifice, the flow induced pressure drop being proportional to the inner diameter of the orifice.

* * * * *